Figure 1:
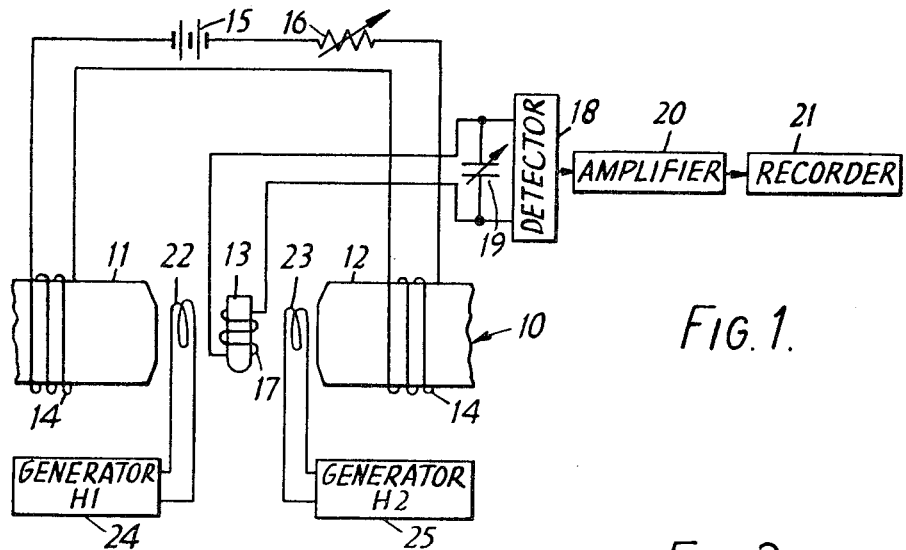

United States Patent
Wright

[15] 3,638,104
[45] Jan. 25, 1972

[54] METHODS AND APPARATUS FOR EXAMINATION AND MEASUREMENT BY MEANS OF NUCLEAR MAGNETIC RESONANCE PHENOMENA

[72] Inventor: Reginald Graham Wright, Newport Pagnell, England

[73] Assignee: Newport Instruments Limited, Newport, Pagnell, England

[22] Filed: June 2, 1969

[21] Appl. No.: 829,679

[30] Foreign Application Priority Data

June 7, 1968  Great Britain ............. 27,200/68

[52] U.S. Cl. ............................................. 324/0.5
[51] Int. Cl. ............................................ G01n 27/78
[58] Field of Search ................................ 324/0.5

[56] References Cited

UNITED STATES PATENTS 2,894,199  7/1959  Kirchner .................. 324/0.5
3,289,072  11/1966  Schuster ................... 324/0.5

Primary Examiner—Michael J. Lynch
Attorney—Young & Thompson

[57] ABSTRACT

In nuclear magnetic resonance apparatus a sample under test is subjected to a first unidirectional magnetic field and to a second alternating magnetic field perpendicular to said first magnetic field, and the field strength of said first magnetic field and/or the alternation frequency of said second magnetic field is modulated in such manner that the sum of two successive time intervals between detected resonance pulses from the sample is not constant.

13 Claims, 8 Drawing Figures

INVENTOR
REGINALD G. WRIGHT
By Young + Thompson
ATTYS.

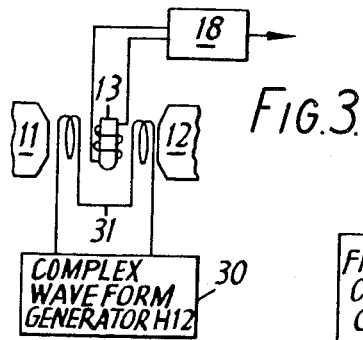
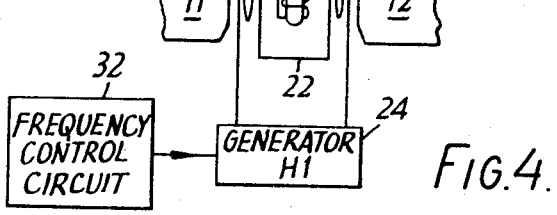
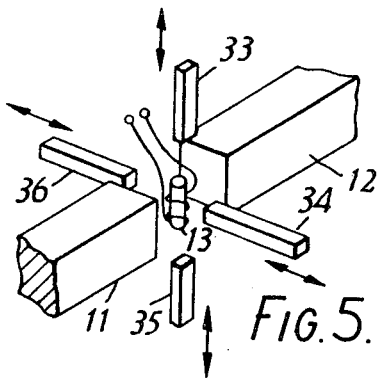
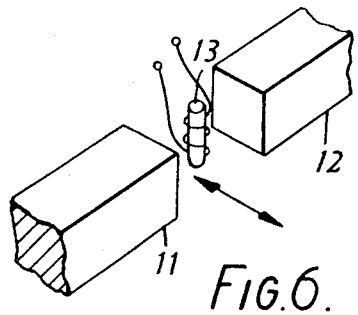
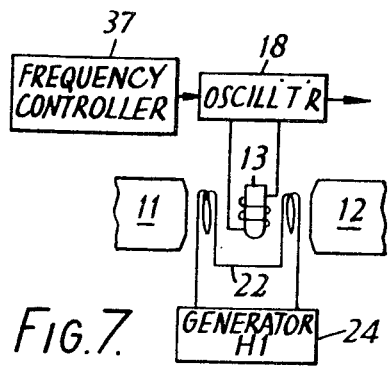
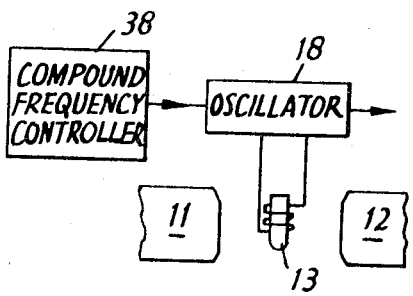

METHODS AND APPARATUS FOR EXAMINATION AND MEASUREMENT BY MEANS OF NUCLEAR MAGNETIC RESONANCE PHENOMENA

This invention relates to methods of and apparatus for examination and measurement by means of nuclear magnetic resonance phenomena, and is more particularly concerned with the examination and measurement of samples which have long relaxation times and which saturate easily.

The use of the nuclear magnetic resonance phenomenon for examination purposes is well known. Broadly, a sample of a substance under test is subjected to a first unidirectional magnetic field and to a second alternating magnetic field perpendicular to the first field. At a particular alteration frequency of the alternating field which is related to the strength of the unidirectional field, power is absorbed from the alternating field, and from this power absorption an electrical signal may be derived which is indicative of the condition of resonance.

In most practical nuclear magnetic resonance circuit arrangements provision is made to modulate or sweep either the alteration frequency of the alternating magnetic field, or, more usually, the field strength of the unidirectional field, in order to embrace the respective resonance conditions for a number of different materials and thereby allow determination of the identity of the particular sample of material under examination. This modulation or sweeping of the unidirectional field or of the alternation frequency of the alternating magnetic field results in the production of a resonance signal having the form of a bell-shaped pulse each time the modulation causes the magnetic field to pass through the particular value establishing the resonance condition for the sample.

In United Kingdom Pat. No. 1,125,482 there is described nuclear magnetic resonance apparatus comprising a magnet providing a unidirectional magnetic field, a modulation coil for superimposing a small variation on the steady unidirectional field, and a resonance detector circuit connected to a coil surrounding the sample and through which a high-frequency oscillatory magnetic field can be applied to the sample.

In a typical measurement with this known form of apparatus, a cyclically varying current is applied to the modulation coil for cyclically varying the intensity of the unidirectional field. The frequency of the detector oscillator circuit is then adjusted until a resonance peak is observed each time the modulation causes the resultant magnetic field to pass through the value of the unidirectional field.

With samples having relaxation times much shorter than the period of the modulating waveform, a single pulse is observed each time the resultant magnetic field passes through the value for resonance. With samples having relatively long relaxation times, however, each pulse may be followed by an oscillatory decaying waveform, which is a well-known phenomenon described as "ringing." When the relaxation time of the sample becomes of the same order of magnitude or longer than the period of the modulating waveform, the "ringing" may not decay to zero before the next resonance pulse occurs. This "ringing" effect may therefore build up to a high level and interfere seriously with the measurement of the resonance signals. External interference causing changes in the unidirectional magnetic field or in the oscillator frequency alters the "ringing" waveform and may cause large variations in the resonance pulses.

Previous techniques for avoiding these troublesome effects require the use of very low levels of oscillator power, with the consequent disadvantage of a low signal-to-noise ratio for the detected resonance pulse signals.

It is the primary object of the present invention to suppress this "ringing" by modifying the form of modulation applied to the nuclear magnetic resonance apparatus.

This is achieved in accordance with the present invention by subjecting a sample to a first unidirectional magnetic field and to a second alternating magnetic field perpendicular to said first magnetic field, and modulating the field strength of said first magnetic field and/or the alternation frequency of said second magnetic field whereby an output signal indicative of resonance is obtained each time the resultant magnetic field passes through the resonance condition for the sample, the modulation being such that the sum of two successive time intervals between output signals from a particular sample is not constant.

In a preferred form of the invention, the field strength of the unidirectional magnetic field is modulated by a primary cyclic modulation and by a secondary modulation superimposed on the primary modulation. For example, the primary modulation may be represented by a triangular waveform and the secondary modulation by a sinusoidal waveform.

The invention may be applied to situations where it is required to suppress the "ringing" effect or the buildup of "ringing"; where it is required to reduce the level of saturation of a sample; where it is required to improve the stability of a resonance signal from a sample exhibiting saturation in the presence of interference causing disturbances to the magnetic field or to the frequency of the resonance oscillator or to the frequencies used for measurement; where it is required to indicate or measure the presence of long relaxation times or of saturation, by altering or switching off the secondary modulation and observing the effect on the resonance signals; where it is required to distinguish between the signals from different components of a sample having different relaxation times; or where it is required to obtain an improved signal-to-noise ratio for the detected resonance pulses.

Figure 2:
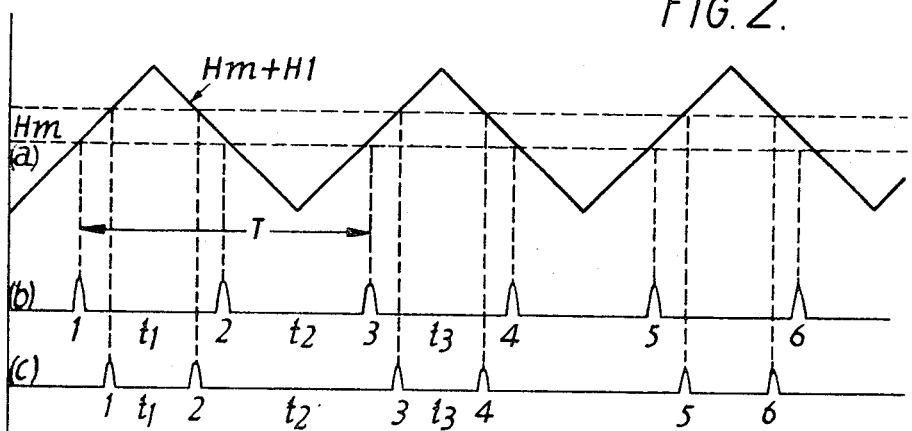
Figure 2:
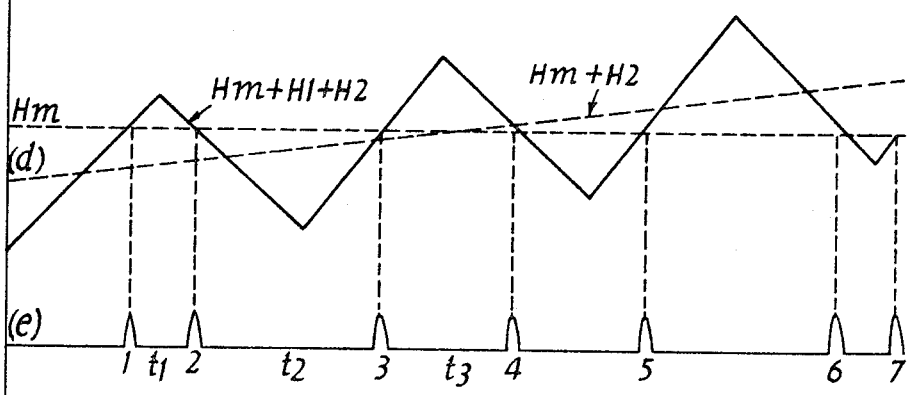

In order that the invention may be fully understood, a number of embodiments in accordance with the invention will now be described by way of example and with reference to the accompanying drawings, in which:

FIG. 1 is a block schematic diagram of gyromagnetic resonance apparatus in accordance with the invention and including first and second generators of primary and secondary modulation respectively;

FIGS. 2($a$), 2($b$) and 2($c$) illustrate the known method of modulating the field by a single cyclically varying modulation;

FIGS. 2($d$) and 2($e$) illustrate the principle of the present invention which uses a modified form of modulation; and, FIGS. 3 to 8 are schematic illustrations showing alternative ways of achieving a modified form of modulation in accordance with the invention.

Reference is first made to FIGS. 1 and 2 of the drawings. The arrangement shown in FIG. 1 comprises a magnet structure 10 illustrated by opposing pole pieces 11 and 12 for providing a homogeneous unidirectional magnetic field within which a material sample 13 is placed. The pole pieces 11 and 12 are surrounded by magnet windings 14 for energization by a suitable direct current source, shown symbolically as a battery 15. A variable series resistor 16 in the supply leads to the windings 14 permits adjustment of the field intensity provided by the windings.

A further winding 17 surrounds the sample 13 and is connected to a self-oscillating nuclear magnetic resonance detector 18, whereby the winding 17 is supplied with a high-frequency oscillation in order to provide a high-frequency magnetic field lying at right angles to the unidirectional magnetic field and which is necessary for the establishment of nuclear magnetic resonance within the material sample 13. The winding 17 forms part of the resonant tank circuit of the detector 18 and a variable capacitor 19 is connected across the winding 17 to allow adjustment of the oscillation frequency of the detector 18.

The derived resonance pulse signals at the output of the detector 18 are fed to an amplifier 20, and the output therefrom is supplied to a recorder 21 of suitable form.

Adjacent to the pole pieces 11 and 12 are provided sweep coil windings 22 and 23 respectively (hereinafter referred to as modulation windings). The modulation winding 22 is connected to a first current waveform generator 24 and the modulation winding 23 is connected to a second current waveform generator 25.

In FIGS. 1 and 2 and in the following description the value of the unidirectional magnetic field provided by the pole pieces 11 and 12 is referred to as $Hm$; the modulation field provided by the winding 22 and generator 24 is referred to as $H1$; and the modulation field provided by the winding 23 and generator 25 is referred to as $H2$.

In the known systems, such as described in United Kingdom Pat. No. 1,125,482, only one generator and modulation winding are used and the generator supplies a simple cyclically varying current to the winding. In FIG. 2(a) which represents this known manner of modulating the strength of the unidirectional field, the unidirectional field is indicated by the horizontal broken line $Hm$ and is plotted as a function of time, and the resultant modulated field $Hm+H1$ is indicated as a regular triangular waveform. In operation, the cyclically varying current from the generator, such as 24, to the modulation winding causes the otherwise steady value of the unidirectional field to be increased and decreased regularly once in each cycle period of the modulation waveform. At particular values of the unidirectional field related to the operating frequency of the high-frequency oscillation supplied by the detector circuit 18 to the winding 17, nuclear resonance occur within the sample 13. The frequency of the oscillator 18 may be adjusted so that the resonance peaks will be observed each time the resultant modulated field passes through the value $Hm$, as shown in FIG. 2(b). Should the oscillator frequency be slightly higher or lower, resonance will occur at slightly lower or higher field values respectively, as shown, for example, in FIG. 2(c).

It will be noted however that with this known method of modulating the magnetic field using the one generator 24 and a single modulation winding 22 and employing the cyclic triangular modulation waveform shown, that the time intervals between the resonance peaks are regular and the sum of two successive time intervals between peaks is equal to the period of the modulation waveform H1. In other words, the time interval $(t_1+t_2)$ between the peaks 1 and 3 or the time interval $(t_2+t_3)$ between the peaks 2 and 4, for example, of FIG. 2(b) is constant and equal to the period T of the waveform H1. Similarly, in FIG. 2(c) the time interval $(t_1+t_2)$ between the peaks 1 and 3 or the time interval $(t_2+t_3)$ between the peaks 2 and 4, for example, is likewise constant and equal to the period T of the modulating waveform H1.

In accordance with the present invention, this known modulation arrangement illustrated by FIGS. 2(a), 2(b) and 2(c) using a single modulation generator is modified, as shown in FIG. 1, by the addition of the second generator 25 and its associated winding 23. In a preferred form of the invention, the generator 24 superimposes a triangular waveform H1 of about 3 gauss peak-to-peak amplitude at 33 Hz. onto the steady magnetic field $Hm$ and the second generator 25 superimposes a triangular waveform H2 of for example between 0.02 and 0.5 gauss peak-to-peak amplitude at a frequency of about 2 Hz. onto the modulated field, giving a resultant field variation ($Hm+H1+H2$) as shown in FIG. 2(d), only a part of the waveform H2 being shown in FIG. 2(d) for clarity. If the frequency of the detector oscillator 18 is adjusted so that the resonance peaks occur at a field value $Hm$, resonance peaks will be observed at the time instants shown in FIG. 2(e). It will be noted that the time intervals between successive peaks 1, 2, 3, 4 etc., are no longer regular as in FIGS. 2(b) and 2(c), but vary according to the value of the secondary modulation waveform H2. In other words, the time interval $(t_1+t_2)$ no longer equals the time interval $(t_2+t_3)$, and so on. By the use of this secondary modulation H2 the intense "ringing" which may build up with samples having long relaxation times is suppressed.

Physically, the action of the secondary modulation used with the present invention may be described as preventing a phase coherence from being established between the precessing nuclei and the oscillator 18. This may reduce the level of saturation which can be built up by the nuclei or atomic particles, and this phase incoherence may induce relaxation, thus further lowering the level of saturation.

Although the embodiment described above uses secondary modulation H2 having a triangular waveform, a sinusoidal waveform may alternatively be used.

It should further be realized that either or both of the primary and secondary modulations may have waveforms other than triangular or sinusoidal, and may have frequencies and amplitudes differing from the specific values given above which are by way of illustration only. In particular, the secondary modulation provided by the generator 25 and the winding 23 may have a random waveform rather than a cyclically varying waveform.

The present invention has so far been described in terms of two separate generating systems providing for example two triangular modulations or one triangular and one sinusoidal modulation, but it will be apparent that the broad principle of the present invention, i.e., modulating the magnetic field in such manner that the resonance pulses occur irregularly as shown in FIG. 2(e), can be achieved in many other ways. A number of such alternative modulating arrangements will now be described with reference to FIGS. 3 to 8, bearing in mind that in each case the modulation is such as to produce resonance pulses where the sum of two successive time intervals between pulses is not a constant value. In these diagrammatic representations certain of the elements shown in FIG. 1 have been omitted for clarity, but in practice the basic system of FIG. 1 would be used.

As shown in FIG. 3, the primary and secondary modulations H1 and H2 may be combined as a single modulation H12 of complex waveform provided by a complex waveform generator 30 having an associated modulation winding 31.

In the embodiment shown in FIG. 4, the apparatus includes only the single generator 24 of modulation H1 and its modulation winding 22, and the secondary modulation of the present invention is provided by a frequency control circuit 32 which is connected to the generator 24 and which varies the frequency of the modulation waveform H1. This will vary the time intervals between the resonance peaks. Alternatively, the secondary modulation may be provided by varying the shape of the waveform H1. In this special case the time intervals between resonance peaks may be regular but the angle through which the nuclei have precessed may be made to vary.

The modulations have heretofore been described as being applied to the magnetic field by coil means, but modulation of the magnetic field may be achieved in other ways. As shown in FIG. 5, four magnets 33, 34, 35 and 36 are positioned around the gap between the pole pieces 11 and 12 where the sample 13 is mounted. These magnets 33 to 36 are mounted for reciprocating movement relative to the sample and to the pole pieces 11 and 12 and by a suitable movement of the magnets the primary and secondary modulation of the field may be achieved. In general, the desired modulation may be achieved by the variation or movement or rotation of magnetic material or a magnet or magnets in a suitable position relative to the unidirectional magnetic field.

The supplementary modulation effect of the present invention may also be achieved by using a magnetic field which varies with position instead of with time, and by moving the sample relative to this field in such a way that the nuclei or atomic particles in the sample experience a field varying with time. The sample movement may be rotational or translational or a combination of these, and FIG. 6 schematically illustrates a translational sample movement.

The modulation effects described above have been achieved by varying the magnetic field applied to the sample, but it will be realized by those skilled in the art that since the effects of small variations of magnetic field may be reproduced equally by equivalent small variations of frequency, the same result can be achieved if one or other or both of the primary and secondary modulations are modulations of the frequency of the oscillator detector 18.

FIG. 7 illustrates an embodiment in which a single modulation generator 24 is used with its associated modulation winding 22, and associated with the oscillator 18 is a frequency controller 37 which provides a single-mode modulation of the oscillator frequency, whereby the generator 24 provides the primary modulation and the frequency controller 37 provides the secondary modulation required by the invention.

Alternatively, as shown in FIG. 8, the generator 24 and winding 22 can be omitted altogether and both the primary and secondary modulations required by the invention are achieved by the use of a compound frequency controller 38 connected to the oscillator 18 and arranged to modulate the frequency of the oscillation in first and second modes.

The invention has been particularly described in connection with a gyromagnetic resonance oscillator 18, but other forms of magnetic resonance detector may equally well be used.

I claim:

1. Magnetic resonance apparatus comprising resonance detecting means having a sensing coil arranged to surround a test material sample and including means to induce oscillation in the sensing coil to provide an alternating magnetic field, means for establishing a unidirectional magnetic field perpendicular to said alternating magnetic field in the region of said sensing coil, and modulation means effective to sweep said unidirectional field causing the resultant magnetic field to pass through the resonance condition for the sample and hence generate an output signal indicative of resonance at successive time instants which are spaced at intervals such that the sum of two successive time intervals is not constant.

2. Apparatus as claimed in claim 1, in which said modulation means modulates the intensity of said unidirectional field and includes generator means providing at least one modulation component having a peak-to-peak amplitude many times greater than the resonance line width.

3. Apparatus as claimed in claim 1, in which said modulation means comprises first and second windings positioned adjacent to said sensing coil in the unidirectional field, and first and second waveform generators respectively connected to said first and second windings, said first waveform generator being arranged to energize said first winding to superimpose a primary modulation of a first amplitude on said unidirectional field and said second waveform generator being arranged to energize said second winding to superimpose a secondary modulation of a second amplitude on said unidirectional field.

4. Apparatus as claimed in claim 3, wherein said first generator and said second generator both provide cyclic modulation waveforms.

5. Apparatus as claimed in claim 3, wherein said first generator provides a cyclic modulation waveform and said second generator provides a random modulation waveform.

6. Apparatus as claimed in claim 1, wherein said modulating means comprises a winding located adjacent to the sensing coil in the unidirectional magnetic field and a generator connected to said winding and arranged to supply a single modulation of complex noncyclic waveform.

7. Apparatus as claimed in claim 3, wherein said first generator is arranged to provide a triangular waveform and said second generator is arranged to provide a sinusoidal waveform.

8. Apparatus as claimed in claim 1, wherein said modulating means comprises a winding located adjacent to the sensing coil in the unidirectional magnetic field, a generator connected to said winding and arranged to supply a cyclic modulation waveform thereto, and means connected to said generator and arranged to vary the frequency of the cyclic waveform produced thereby.

9. Apparatus as claimed in claim 1, wherein said modulating means comprises at least one element of magnetic material positioned adjacent to said means establishing a magnetic field and arranged to be movable relative thereto to produce the modulation of the field strength of the unidirectional magnetic field.

10. Magnetic resonance apparatus comprising resonance detecting means having a sensing coil arranged to surround a test material sample and including means to induce oscillation in the sensing coil to provide an alternating magnetic field, means for establishing a unidirectional magnetic field perpendicular to said alternating magnetic field in the region of said sensing coil, and modulation means effective to sweep the frequency of the alternating magnetic field causing the resultant magnetic field to pass through the resonance condition for the sample and hence generate an output signal indicative of resonance at successive time instants which are spaced at intervals such that the sum of two successive time intervals is not constant.

11. Apparatus as claimed in claim 10, in which said sensing coil is connected as part of the resonant tank circuit of a self-oscillating nuclear magnetic resonance detector, and said modulation means comprises means connected to the detector and operative to modulate the frequency of the detector in first and second modes.

12. Magnetic resonance apparatus comprising resonance detecting means having a sensing coil arranged to surround a test material sample and including means to induce oscillation in the sensing coil to provide an alternating magnetic field, means for establishing a unidirectional magnetic field perpendicular to said alternating magnetic field in the region of said sensing coil, and first and second modulation means respectively effective to sweep the unidirectional field and the frequency of the alternating magnetic field causing the resultant magnetic field to pass through the resonance condition for the sample and hence generate an output signal indicative of resonance at successive time instants which are spaced at intervals such that the sum of two successive time intervals is not constant.

13. Apparatus as claimed in claim 12, in which said first modulation means modulates the intensity of said unidirectional field and includes generator means providing a modulation having a peak-to-peak amplitude many times greater than the resonance line width.

* * * * *